(12) United States Patent
Puranen

(10) Patent No.: US 10,011,459 B2
(45) Date of Patent: Jul. 3, 2018

(54) SAFETY CIRCUIT AND ELEVATOR SYSTEM WITH OPTICAL CABLE

(71) Applicant: KONE Corporation, Helsinki (FI)

(72) Inventor: Mikko Puranen, Riihimäki (FI)

(73) Assignee: KONE CORPORATION, Helsinki (FI)

( * ) Notice: Subject to any disclaimer, the term of this patent is extended or adjusted under 35 U.S.C. 154(b) by 559 days.

(21) Appl. No.: 14/604,176

(22) Filed: Jan. 23, 2015

(65) Prior Publication Data

US 2015/0166303 A1 Jun. 18, 2015

Related U.S. Application Data

(63) Continuation of application No. PCT/FI2013/050778, filed on Jul. 29, 2013.

(30) Foreign Application Priority Data

Aug. 7, 2012 (FI) ...................................... 20125834

(51) Int. Cl.
| | |
|---|---|
| *B66B 1/34* | (2006.01) |
| *B66B 13/22* | (2006.01) |
| *B66B 5/02* | (2006.01) |
| *H04B 10/25* | (2013.01) |

(52) U.S. Cl.
CPC .............. *B66B 1/3446* (2013.01); *B66B 5/02* (2013.01); *B66B 13/22* (2013.01); *H04B 10/25* (2013.01)

(58) Field of Classification Search
CPC ......... B66B 1/3446; B66B 5/02; B66B 13/22; H04B 10/25

USPC .................................. 187/247, 277, 391, 393
See application file for complete search history.

(56) References Cited

U.S. PATENT DOCUMENTS

| | | | |
|---|---|---|---|
| 5,186,300 A * | 2/1993 | Zaharia | B66B 29/00 198/322 |
| 6,267,219 B1 * | 7/2001 | Spannhake | B66B 29/005 198/322 |
| 6,446,760 B1 | 9/2002 | Lisi | |
| 6,771,903 B1 | 8/2004 | Cousineau | |

(Continued)

FOREIGN PATENT DOCUMENTS

| | | |
|---|---|---|
| CN | 2399362 Y | 10/2000 |
| CN | 1291584 A | 4/2001 |

(Continued)

*Primary Examiner* — Anthony Salata

(74) *Attorney, Agent, or Firm* — Birch, Stewart, Kolasch & Birch, LLP

(57) ABSTRACT

The safety circuit includes a safety switch or a series circuit of safety switches, which includes an input for an electrical safety circuit signal as well as an output, in which the electrical safety circuit signal being supplied to the input is present when all the safety switches are closed. The safety circuit also includes a cable including an optical fiber as well as a transmitter circuit for the optical signal, the output of which circuit is connected to the cable including an optical fiber. The input of the transmitter circuit is connected to the output of the aforementioned safety switch or of the series circuit of safety switches, and the transmitter circuit is configured to transmit in the optical fiber of the cable the safety circuit signal that is present in the output of the safety switch or of the series circuit of safety switches.

15 Claims, 4 Drawing Sheets

1: series circuit
2: input
3: output
4: traveling cable
5: transmitter circuit
6: receiver circuit
7: LED radiation source
8, 15, 16, 17: safety relay
18: signal amplifier
19: voltage source

(56) References Cited

U.S. PATENT DOCUMENTS

| | | | | |
|---|---|---|---|---|
| 7,193,510 B2* | 3/2007 | Nickels | ............... | H01H 47/002<br>340/500 |
| 7,334,665 B2* | 2/2008 | Smith | ..................... | B66B 1/34<br>187/247 |
| 7,614,481 B2* | 11/2009 | Okamoto | ................. | B66B 5/06<br>187/290 |
| 7,849,972 B2* | 12/2010 | Higashinaka | ............. | B66B 5/18<br>187/286 |
| 8,418,813 B2* | 4/2013 | Yim | ......................... | B66B 1/34<br>187/247 |
| 8,585,158 B2* | 11/2013 | Gewinner | ................. | B66B 1/32<br>303/199 |
| 8,692,648 B2* | 4/2014 | Dantas | ................... | B66F 7/065<br>187/211 |
| 8,820,482 B2* | 9/2014 | De Coi | ................ | B66B 5/0031<br>187/247 |
| 8,899,383 B2* | 12/2014 | De Coi | ................... | B66B 13/22<br>187/247 |
| 9,663,323 B2* | 5/2017 | Stolt | ........................ | B66B 1/30 |
| 2005/0098390 A1 | 5/2005 | Angst | | |
| 2012/0186914 A1 | 7/2012 | Birrer | | |
| 2014/0345978 A1* | 11/2014 | Alasentie | ............... | B66B 7/064<br>187/254 |

FOREIGN PATENT DOCUMENTS

| | | | |
|---|---|---|---|
| CN | 102596780 A | | 7/2012 |
| CN | 204375473 U | * | 6/2015 |
| EP | 0 897 892 A2 | | 2/1999 |
| EP | 1 731 470 A1 | | 12/2006 |
| EP | 1 864 935 A1 | | 12/2007 |
| EP | 1 894 874 A1 | | 3/2008 |
| FR | 2775272 A1 | | 8/1999 |
| JP | 2002348067 A | * | 12/2002 |
| JP | 2005-47660 A | | 2/2005 |
| WO | WO 02/46081 A2 | | 6/2002 |
| WO | WO 2010/122211 A1 | | 10/2010 |
| WO | WO 2012/062553 A1 | | 5/2012 |

* cited by examiner

1: series circuit
2: input
3: output
4: traveling cable
5: transmitter circuit
6: receiver circuit
7: LED radiation source
8, 15, 16, 17: safety relay
18: signal amplifier
19: voltage source 1: series circuit
2: input
3: output
4: traveling cable
5: transmitter circuit
6: receiver circuit
7: LED radiation source
15, 16, 17: safety relay
18: signal amplifier 4: traveling cable
5: transmitter circuit
6: receiver circuit
9: frequency converter
10: hoisting machine
11: machinery brakes
12: elevator car
13: elevator hoistway
14A: call-giving devices on the stopping floors
14B: call-giving devices in the elevator car
15, 16, 17: safety relay

SAFETY CIRCUIT AND ELEVATOR SYSTEM WITH OPTICAL CABLE

CROSS REFERENCE TO RELATED APPLICATIONS:

This application is a Continuation of PCT International Application No. PCT/FI2013/050778, filed on Jul. 29, 2013, which claims priority under 35 U.S.C. 119(a) to Patent Application No. 20125834, filed in Finland on Aug. 7, 2012, all of which are hereby expressly incorporated by reference into the present application.

FIELD OF THE INVENTION

The invention relates to safety arrangements for an elevator.

BACKGROUND OF THE INVENTION

In an elevator system, there must be a safety system, by the aid of which the operation of the elevator system can be stopped e.g. as a consequence of a defect or of an operating error. The aforementioned safety system comprises a safety circuit, which comprises safety switches connected to each other in series, which switches are disposed in different parts of the elevator system to monitor the safety of the system. The safety switches are connected to each other in series with conductors, in which an electrical safety circuit signal travels as long as the safety switches are closed. When a safety switch opens, the passage of the safety circuit signal in the safety circuit is disconnected. The opening of a safety switch indicates that the safety of the elevator system has been jeopardized. The safety circuit signal can be e.g. a direct-current signal or an alternating-current signal of the voltage frequency of the electricity network.

The length of the safety circuit often forms a problem, particularly in high-rise buildings, because the resistance in long conductors causes a large voltage loss in the safety circuit signal. In addition, the loop of the safety circuit traveling in particular in the traveling cable of the elevator car is very sensitive to interference, because there are also many other signals, sometimes for a distance of hundreds of meters, traveling in the immediate proximity of the safety circuit conductors in the traveling cable.

A breakage of the protective sheath of a safety circuit conductor might cause an earth fault, in which case an earth fault current starts to travel from the electricity supply of the safety circuit into a conducting structure in the building. As a result of the earth fault the operation of the elevator must be stopped; on the other hand, an earth fault current might also cause failure of one or more elevator components.

Aim of the Invention

An aim of the invention is to improve the structure of the safety circuit of an elevator in order to reduce the voltage losses occurring in the safety circuit. One aim of the invention is to improve the fault tolerance of the safety circuit of an elevator as a precaution against an earth fault. One aim of the invention is to improve the interference tolerance of a safety circuit of an elevator to excessive wear and/or to any EMC interference connecting to the safety circuit cables. Another aim of the invention is to present an elevator system in which an improved safety circuit according to the invention is utilized.

To achieve these aims the invention discloses a safety circuit and also an elevator system. The preferred embodiments of the invention are described in the dependent claims. Some inventive embodiments and inventive combinations of the various embodiments are also presented in the descriptive section and in the drawings of the present application.

SUMMARY OF THE INVENTION

The safety circuit according to the invention comprises a safety switch or a series circuit of safety switches, which comprises an input for an electrical safety circuit signal as well as an output, in which the electrical safety circuit signal being supplied to the input is present when, and only when, all the safety switches are closed. The safety circuit also comprises a cable comprising an optical fiber as well as a transmitter circuit for an optical signal, the output of which circuit is connected to the cable comprising an optical fiber. The input of the transmitter circuit is connected to the output of the aforementioned safety switch or of the series circuit of safety switches, and the transmitter circuit is configured to transmit in the optical fiber of the cable the safety circuit signal that is present in the output of the safety switch or of the series circuit of safety switches.

The safety circuit according to the invention is also suited for use in escalator systems and in travelator systems, in addition to elevator systems, configured in such a way that the safety switches are closed during uninterrupted operation of the escalator/travelator, and that each of the safety switches is configured to open owing to some functional nonconformance of the escalator/travelator. In the safety circuit according to the invention the safety circuit signal that is present in the output of the safety switch or of the series circuit of safety switches is disconnected when a safety switch opens. Consequently, a continuous safety circuit signal traveling in the optical fiber indicates that the system is operating normally, and a functional nonconformance of the system is detected as a disconnection of the safety circuit signal traveling in the optical fiber. The system is also fail-safe, because a break/disconnection of the optical fiber or a failure of the radiation source in the transmitter circuit results in disconnection of the safety circuit signal traveling in the optical fiber.

The elevator system according to the invention comprises an elevator car and also an electric drive, which is configured to drive the elevator car in an elevator hoistway according to elevator calls. The elevator system further comprises a safety circuit according to the invention.

When the safety circuit signal is conveyed along the optical fiber as an optical signal and not as an electrical current/voltage signal, the effects of voltage reduction and electromagnet interference in the conveying of the safety circuit signal are eliminated or at least essentially reduced. Likewise, the risk of an earth fault in the safety circuit decreases because optical fiber does not conduct electricity like conventional safety circuit cables. Additionally, when using optical fiber the different parts of a safety circuit can also be easily galvanically separated from each other, which, inter alia, reduces the common-mode interference connecting to the safety circuit cables because galvanically separating optical fiber disconnects the pathway for common-mode interference in the safety circuit.

When conveying a safety circuit signal in an optical fiber the power losses are smaller than when conveying a current/ voltage signal in a conventional safety circuit cable. In this case the power consumption of the safety circuit also decreases.

The safety circuit according to the invention can also be formed from a number of series circuits of safety circuit switches, the safety circuit signal traveling in each of which series circuits of safety circuit switches being conveyed along a separate cable comprising an optical signal.

The preceding summary, as well as the additional features and additional advantages of the invention presented below, will be better understood by the aid of the following description of some embodiments, said description not limiting the scope of application of the invention.

MORE DETAILED DESCRIPTION OF PREFERRED EMBODIMENTS OF THE INVENTION

Figure 1:
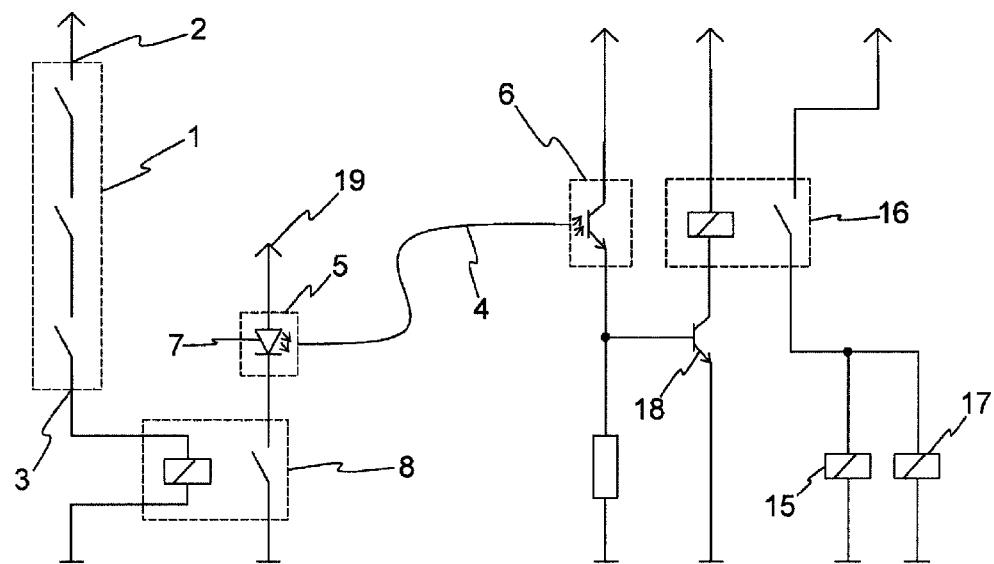
FIG. 1 presents as a circuit diagram one safety circuit according to an embodiment of the invention.

In the embodiment of the invention according to FIG. 1 the safety circuit of an elevator comprises a series circuit 1 of positive-opening, mechanical safety switches 1. The series-connected safety switches 1 are fitted in connection with the elevator car. A safety switch can be e.g. one or more of the following:
- a safety switch monitoring the position/locking of an emergency exit hatch of the elevator car
- a safety switch monitoring the extreme limits of permitted movement of the elevator car in the elevator hoistway
- a safety switch monitoring the operation of a mechanical brake/the safety gear of the elevator car
- a switch in the service drive unit of the elevator, with which switch the safety circuit is disconnected/the elevator is switched into service drive mode
- a safety switch monitoring the locking of the door of the elevator car.

In FIG. 1 the input 2 of the series circuit 1 of safety switches is connected to a DC voltage source, which consequently supplies a DC safety circuit signal to the series circuit 1. The output 3 of the series circuit 1 of safety switches, on the other hand, is connected to the control coil of a safety relay 8. The output 3 is live, i.e. the safety circuit signal is present in the output 3, only when all the safety switches 1 are closed. The control coil of the safety relay receives its electricity supply from the output 3 of the series circuit of safety switches. The safety switches 1 are fitted in connection with the elevator car in such a way that the safety switches are closed during normal operation of the elevator, and the opening of a safety switch signifies a functional nonconformance of the elevator system, such as the opening of an emergency exit hatch of an elevator car, the arrival of an elevator car at an extreme limit of permitted movement in the elevator hoistway, safety-gear gripping of the elevator car, the opening of a door of the elevator car and also use of the service drive switch of the elevator car. Consequently, the voltage supply from the input 2 of the series circuit 1 of safety switches to the output 3 ceases, the safety circuit signal is disconnected and the contact of the safety relay 8 opens when a functional nonconformance is detected in the elevator car.

The safety circuit comprises a transmitter circuit 5 for an optical signal, the output of which circuit is connected to a traveling cable 4 comprising an optical fiber. The transmitter circuit 5 comprises a LED radiation source 7 operating with electricity, which radiation source forms the (preferably IR frequency) signal to be transmitted in the optical fiber, when the necessary operating voltage is supplied to the radiation source 7. The contact of the safety relay 8 is connected to the input of the transmitter circuit 5 for the optical signal in such a way that the radiation source 7 receives its operating voltage from a voltage source 15 when the contact of the safety relay 8 is closed. One advantage of the solution is that the length of the supply conductors from the voltage source 19 to the transmitter circuit 5 and onwards via the contact of the safety relay 8 to the ground can be minimized; on the other hand, when performing a fault analysis of the system, possible jamming of the contact of the safety relay 8 in the closed position must also be taken into account. For achieving the safety integrity level required of a safety circuit of an elevator, the state of the contact of the safety relay can also, if necessary, be monitored with a separate supervision circuit (not presented in FIG. 1) or the contact of the safety relay 8 can be duplicated, and the duplicated contacts can be connected to each other in series.

When the safety switches in the serial connection 1 are closed, the contact of the safety relay 8 is also closed, supplying operating voltage to the LED radiation source 7 of the transmitter circuit 5. In this case the transmitter circuit 5 transmits the safety circuit signal that is present in the output 3 of the series circuit 1 of safety switches as a continuous optical safety circuit signal in the optical fiber of the traveling cable 4. Consequently the safety circuit signal traveling in the optical fiber indicates that the system is operating normally, and a functional nonconformance of the system is detected as a disconnection of the safety circuit signal traveling in the optical fiber.

The optical fiber of the traveling cable 4 is connected at the other end of the traveling cable 4 to the input of the receiver circuit 6. The receiver circuit 6 comprises a component that is sensitive to radiation, such as a photodiode or a phototransistor, which reacts to an optical signal being received from the optical fiber of the traveling cable 4. The output of the receiver circuit 6, on the other hand, is connected to the control coil of the safety relay 16 in such a way that the contact of the safety relay 16 opens when the optical signal in the input of receiver circuit 6 is disconnected. Electricity is supplied via the contact of the safety relay 16 to the control coil of the safety relay 15 of the machinery brake of the hoisting machine of the elevator and also to the control coil of the safety relay 17 of the frequency converter of the elevator motor. The safety relays 15, 17 are connected in connection with a machinery brake/the frequency converter in such a way that when the optical safety circuit signal in the input of receiver circuit 6 is disconnected, the machinery brake activates to brake the movement of the elevator car and the power supply from the frequency converter to the elevator motor ceases. For achieving the correct safety integrity level, the receiver circuit 6 as well as the safety relay 16 can also be duplicated, in which case failure of the receiver circuit 6 or of the safety relay 16 will still not prevent activation of the machinery brake and disconnection of the power supply of the elevator motor.

Figure 2:
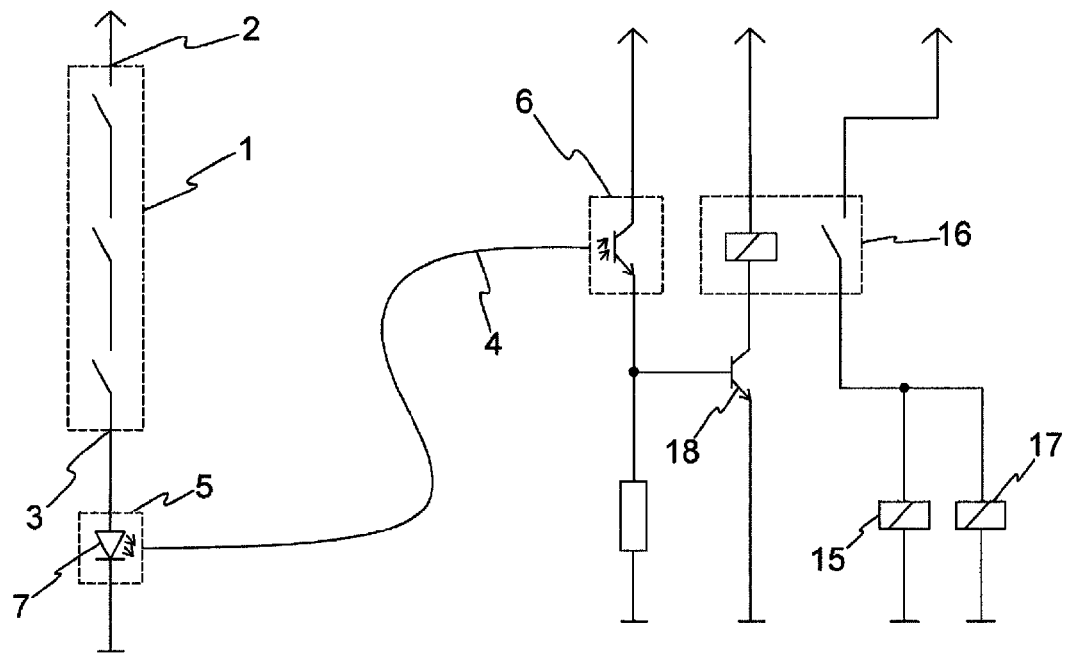
FIG. 2 presents as a circuit diagram one safety circuit according to a second embodiment of the invention.

The safety circuit of an elevator presented in FIG. 2 differs from that presented in FIG. 1 such that the input of the transmitter circuit 5 is connected to the output 3 of the series circuit of safety switches in such a way that the LED radiation source 7 receives operating voltage directly from the output 3 of the series circuit of safety switches. Consequently the safety circuit signal that is present in the output 3 of the series circuit of safety switches travels in the optical fiber of the traveling cable 4 when all the safety switches 1 are closed, and opening of a safety switch, on the other hand, results in disconnection of the operating voltage of the LED radiation source and the cessation of the conveying of the optical safety circuit signal in the optical fiber. The solution can be implemented with relatively few components. In addition, the solution is fail-safe in the sense that when safety switches open, the LED radiation source 7 can in no way receive operating voltage from outside the series circuit 1 of safety switches, in which case operation of the elevator can be prevented reliably.

In the embodiments of FIGS. 1 and 2 the safety switch/series circuit of safety switches 1 connected to the transmitter circuit 5 can also be disposed elsewhere than on the elevator car, and it can comprise e.g. one or more of the following safety switches:
 a safety switch monitoring the position and/or locking of the entrances of the elevator hoistway
 a safety switch monitoring the operation of the overspeed governor of the elevator car
 a safety switch monitoring the operation of the end buffer of the elevator.

Figure 3:
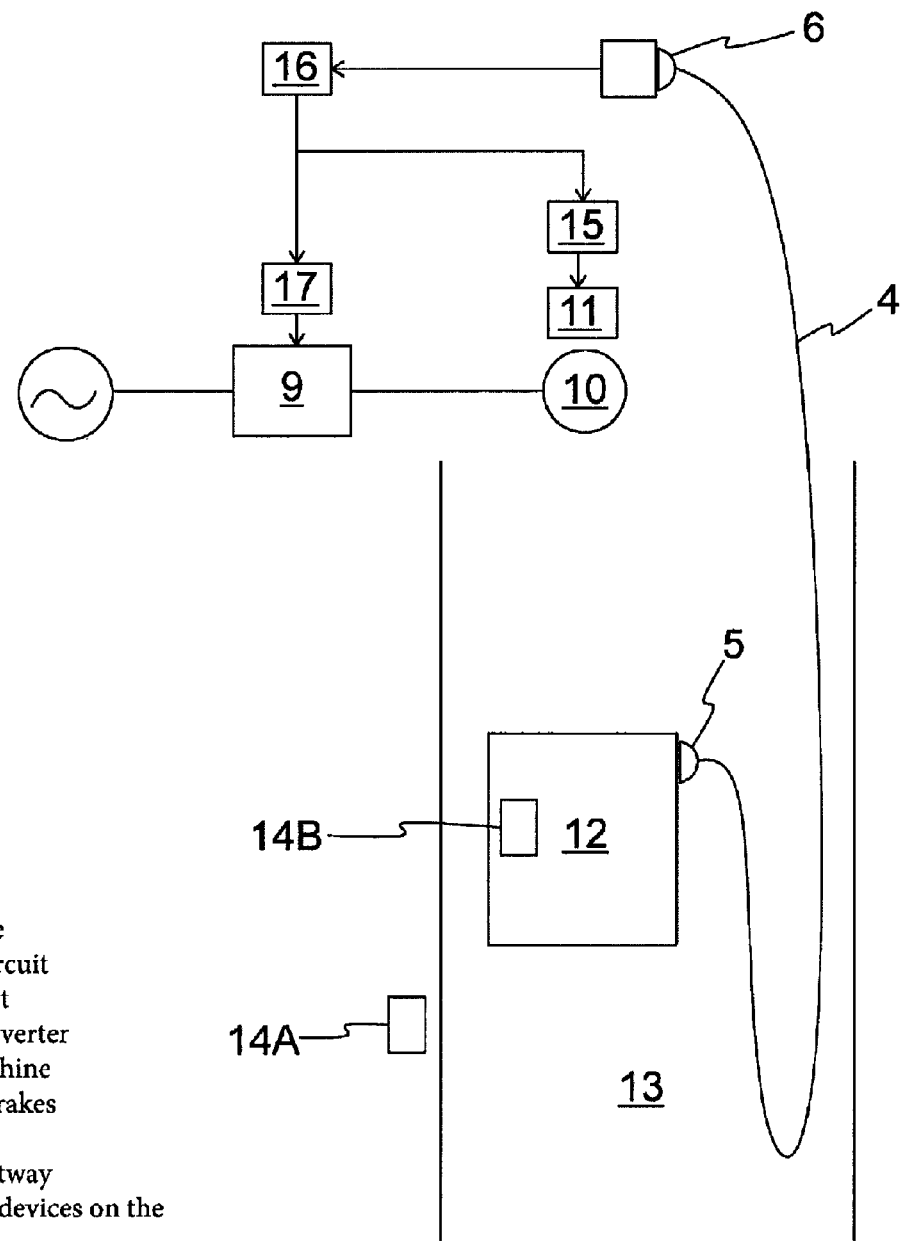
FIG. 3 presents one elevator system according to an embodiment of the invention.

A safety circuit according to FIG. 1 or 2 is fitted into the elevator system diagrammatically presented in FIG. 3. In the elevator system the elevator car 12 is driven up or down in the elevator hoistway 13 according to elevator calls given with the call-giving devices 14A, 14B. Elevator passengers can give elevator calls by means of the call-giving devices on the stopping floors 14A and in the elevator car 14B. The elevator car is driven with an electric drive. The electric drive comprises a hoisting machine 10, with which the driving force needed to drive the elevator car is produced, as well as a frequency converter 9, with which electric power is supplied to the windings of the elevator motor in the hoisting machine 10 for producing the necessary driving force. In addition, the hoisting machine 10 usually comprises two electromagnetic machinery brakes 11, which are activated to brake the movement of the hoisting machine/elevator car by disconnecting the supply of current to the electromagnets of the machinery brakes. The operating principle of an electric drive of an elevator is generally known in the art, and it is not presented here in more detail.

The series circuit 1 of safety switches according to FIGS. 1 and 2 is fitted in connection with the elevator car 12. In addition, a transmitter circuit 5 for the optical signal is fitted in connection with the elevator car, the output of which circuit is connected to the optical fiber that is in the traveling cable 4. The other end of the traveling cable 4 is connected to the input of the receiver circuit 6 for the optical signal, which receiver circuit 6 is fitted to an immobile structure of the elevator system, such as in connection with a wall part of the elevator hoistway 13. In addition to an optical safety circuit signal, also electricity supply cables, with which electricity is supplied to the elevator car 12, are conveyed in the traveling cable. Additionally, the traveling cable can comprise one or more signal cables, in the electrical conductors of which cables electrical control signals are conveyed.

The output of the receiver circuit 6 for the optical signal comprises a signal amplifier 18, in which the electrical signal received from the output of the receiver circuit 6 is amplified before it is taken to the control coil of the safety relay 16 that is in connection with the electric drive of the elevator. The contact of the safety relay 16 controls a safety relay 15 of the machinery brakes as well as a safety relay 17 of the frequency converter, as explained in the embodiments of FIGS. 1 and 2. Consequently, when a safety switch on the elevator car 12 opens, the safety circuit signal traveling in the optical fiber of the traveling cable 4 is disconnected, in which case the elevator system is brought into a safe state by disconnecting with the frequency converter 9 the power supply occurring to the elevator motor of the hoisting machine 10 and also by activating the machinery brakes to brake the movement of the traction sheave of the hoisting machine/the movement of the elevator car.

Figure 4:
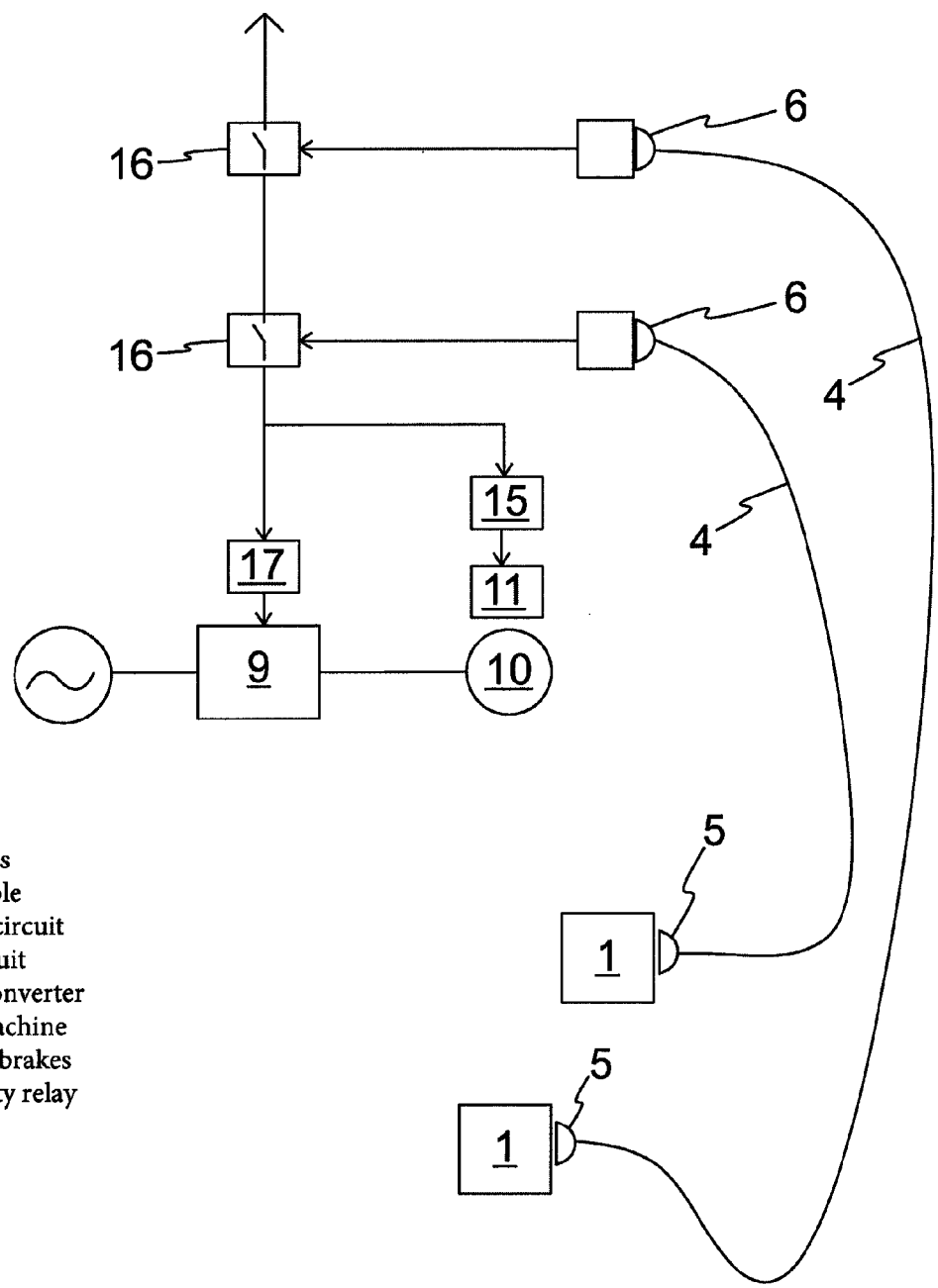
FIG. 4 presents a safety circuit according to one embodiment.

In the embodiment presented in FIG. 4 there are two separate serial circuits 1 of safety switches, in which circuits the safety circuit signals are transferred with separate transmitter circuits 5 along cables 4 comprising an optical fiber, using a circuit according to the embodiment of FIG. 1 or 2. Both of the cables 4 comprising an optical fiber are connected at one of their ends to the receiver circuit 6 for the optical signal, and the output of the receiver circuit 6 of both also is connected to the control coil of a safety relay 16 with a circuit of the type described above. The contacts of the safety relays 16 are connected to each other in series, and control current is supplied via the contacts to the coil of the safety relays 15, 17 of the frequency converter and of the machinery brake. In this case the opening of a safety switch in either serial circuit 1 of safety switches causes the power supply via the frequency converter to the elevator motor to cease and the machinery brakes will activate.

It is obvious to the person skilled in the art that the safety relay 8, 15, 16, 17 according to the invention can be a mechanical or a solid-state switch.

The invention is described above by the aid of a few examples of its embodiment. It is obvious to the person skilled in the art that the invention is not only limited to the embodiments described above, but that many other applications are possible within the scope of the inventive concept defined by the claims.

The invention claimed is:

1. A safety circuit, comprising:
 a safety switch or a series circuit of safety switches, which comprises an input for an electrical safety circuit signal as well as an output, in which the electrical safety circuit signal being supplied to the input is present when all the safety switches are closed;
 a cable comprising an optical fiber;
 a transmitter circuit for an optical signal; and
 a receiver circuit for the optical signal, an input of the receiver circuit being connected to the cable comprising the optical fiber, the receiver circuit comprising a component sensitive to radiation, said component reacting to the optical signal received from the optical fiber of the cable, and transforming the optical signal to a voltage energizing a control coil of a contactor,
 wherein the output of the transmitter circuit is connected to the cable comprising an optical fiber, the input of the transmitter circuit is connected to the output of the safety switch or of the series circuit of safety switches, and the transmitter circuit is configured to transmit in the optical fiber of the cable the safety circuit signal that is present in the output of the safety switch or of the series circuit of safety switches.

2. The safety circuit according to claim 1, wherein the safety switches are positive-opening safety switches.

3. The safety circuit according to claim 1, wherein the transmitter circuit comprises an electrically-operated radiation source, which forms the signal to be transmitted when the necessary operating voltage is supplied to the radiation source.

4. The safety circuit according to claim 3, wherein the input of the transmitter circuit is connected to the output of the safety switch/series circuit of safety switches in such a way that the radiation source receives its operating voltage from the safety circuit signal that is present in the output of the safety switch/series circuit of safety switches.

5. The safety circuit according to claim 3, wherein the safety circuit comprises a safety relay, the input of the transmitter circuit is connected to a contact of the safety relay in such a way that the radiation source receives its operating voltage via the contact of the safety relay, and the control coil of the safety relay is connected to the output of the aforementioned safety switch/series circuit of safety switches.

6. The safety circuit according to claim 1, wherein the output of the receiver circuit is connected to the control pole of the safety relay in such a way that the contact of the safety relay opens when the safety circuit signal in the input of receiver circuit is disconnected.

7. The safety circuit according to claim 1, wherein the receiver circuit for the optical signal is duplicated, and the duplicated inputs of the receiver circuit are connected to the cable comprising an optical fiber.

8. The safety circuit according to claim 1, wherein the safety circuit is a safety circuit for an elevator.

9. The safety circuit according to claim 8, wherein the safety switches are closed during uninterrupted operation of the elevator system, and each of the safety switches is configured to open owing to some functional non-conformance of the elevator system.

10. The safety circuit according to claim 8, wherein an output of the receiver circuit for the optical signal is connected to an electric drive of the elevator.

11. An elevator system, comprising an elevator car and an electric drive, which is configured to drive the elevator car in an elevator hoistway according to elevator calls, wherein the elevator system comprises the safety circuit according to claim 1.

12. The elevator system according to claim 11, wherein an output of the receiver circuit is connected to an electric drive, and the electric drive is configured to prevent a run with the elevator when the safety circuit signal is disconnected.

13. The elevator system according to claim 11, wherein the transmitter circuit for the optical signal is fitted in connection with the elevator car, the receiver circuit for the optical signal is fitted in connection with an immobile structure of the elevator system, and the transmitter circuit for the optical signal and the receiver circuit for the optical signal are connected to each other with the cable comprising the optical fiber.

14. The safety circuit according to claim 2, wherein the transmitter circuit comprises an electrically-operated radiation source, which forms the signal to be transmitted when the necessary operating voltage is supplied to the radiation source.

15. The safety circuit according to claim 1, wherein said component is a photodiode or a phototransistor.

* * * * *